United States Patent [19]

Tatlock

[11] 4,219,612

[45] Aug. 26, 1980

[54] VENTED FILLING PLUGS FOR ELECTRIC STORAGE CELLS

[75] Inventor: Edwin Tatlock, Bolton, England

[73] Assignee: Chloride Group Limited, London, England

[21] Appl. No.: 20,510

[22] Filed: Mar. 14, 1979

[30] Foreign Application Priority Data

Mar. 15, 1978 [GB] United Kingdom ............... 10285/78

[51] Int. Cl.$^2$ .............................................. H01M 2/12
[52] U.S. Cl. ......................................... 429/86; 429/89
[58] Field of Search ............................... 429/78, 86, 89

[56] References Cited

U.S. PATENT DOCUMENTS

| 1,878,223 | 9/1932 | Woodbridge | 429/78 |
| 2,219,134 | 10/1940 | Clercq et al. | 429/86 |
| 2,471,585 | 5/1949 | Rittenhouse et al. | 429/86 |

FOREIGN PATENT DOCUMENTS 38-15720 8/1963 Japan .......................................... 429/86

Primary Examiner—Donald L. Walton
Attorney, Agent, or Firm—Oblon, Fisher, Spivak, McClelland & Maier

[57] ABSTRACT

A vented filling plug for an electric storage cell has a vent path including a flame trap through which gas may enter or leave the cell arranged so as, in use, to communicate with the interior of the cell at a point above the normal electrolyte level. The flame trap includes a liquid trap defined by a trough and a tubular partition, and a ceramic partition. The plug also has a filling path through which electrolyte may be poured into the cell arranged so as, in use, to communicate with the interior of the cell at a point below the normal electrolyte level. The filling path includes a liquid trap defined by a trough and a partition below the normal electrolyte level.

4 Claims, 2 Drawing Figures

4,219,612

VENTED FILLING PLUGS FOR ELECTRIC STORAGE CELLS

BACKGROUND OF THE INVENTION

The invention relates to vented filling plugs for electric storage cells.

During the charging and discharging of electric cells a potentially explosive mixture of gases is frequently liberated. In the case of lead acid accumulators, a stoichiometric mixture of hydrogen and oxygen is liberated. An external spark, static discharge or other high temperature source can start a flame which passes down the inside of the cell and the resultant explosion can rupture the cell casing, spraying acid around and causing considerable damage and danger.

According to the present invention, a vented filling plug for an electric storage cell has a vent path including a flame trap through which gas may enter or leave the cell arranged so as, in use, to communicate with the interior of the cell at a point above the normal electrolyte level, and a filling path through which electrolyte may be poured into the cell arranged so as, in use, to communicate with the interior of the cell at a point below the normal electrolyte level.

Preferably the flame trap in the vent path includes a liquid trap. Alternatively, or in addition, the flame trap may include a foraminous partition, for example of ceramic material.

Preferably the filling path also includes a liquid trap. In a preferred construction, the liquid trap is positioned below the normal electrolyte level and constructed and arranged so that, if the electrolyte is allowed to fall below the level at which the filling path communicates with the interior of the cell, the liquid trap is left at least partially filled with electrolyte.

Thus, even if the user is negligent about keeping the cell topped up with electrolyte, the presence of two liquid traps will render it extremely unlikely that a flame outside the cell will be able to travel into the cell causing it to explode

BRIEF DESCRIPTION OF THE DRAWINGS

Further features and details of the invention will be apparent from the following description of one specific embodiment of a vented plug for use in a standby cell, given by way of example with reference to the accompanying drawings in which.

DETAILED DESCRIPTION OF A PREFERRED EMBODIMENT

Figure 1:
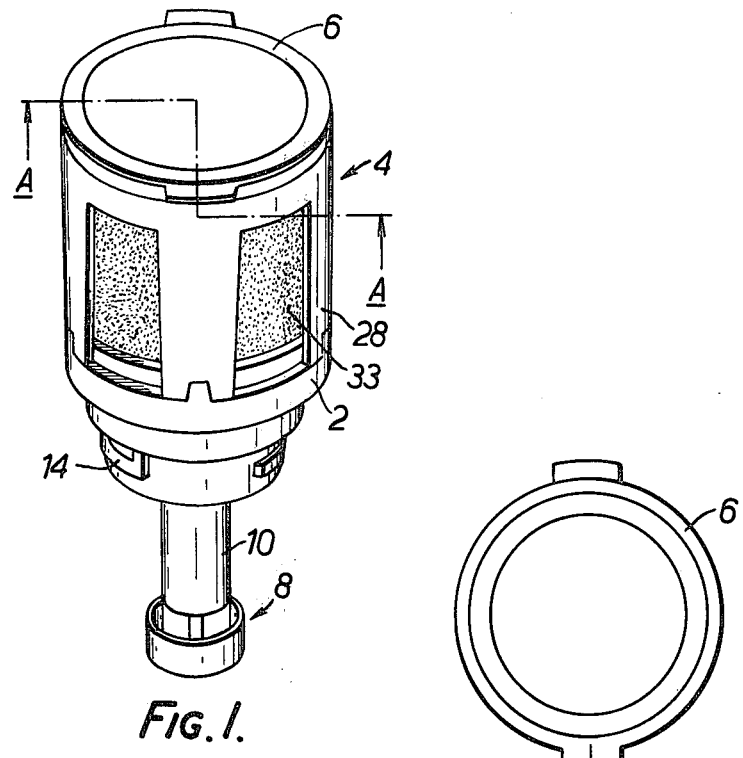
FIG. 1 is a perspective view of a vented filling plug in accordance with the invention.

The plug comprises a base 2 connected to a body 4 carrying a flip top cap 6 of known type and to a low level liquid trap 8 by a connecting tube 10. The base 2 includes a tubular portion 12 which is intended to extend through the lid of an electric storage cell and carries a projection 14 to engage the underside of the lid and to hold a sealing ring 16 in contact with the lid so as to form a liquid seal. Integral with the tubular portion 12 is a circular flange 18 carrying three axially extending concentric ribs 20, 22 24, defining two annular troughs or channels.

The body 4 includes an upper ring 26 to which the cap 6 is hinged. The body 4 carries four depending fingers 28 which engage and are secured to the periphery of the flange 18 of the plug body. Integral with the ring 26 are two concentric tubular portions, the outer of which 30 extends into the trough 31 defined by the ribs 20 and 22 and the inner of which 32 constitutes the filling tube for the cell and extends through and beyond the tubular portion 12 on the base 2. Within the body 4 is positioned a cylinder of ceramic material 33 which rests in a trough 43 between the ribs 22 and 24.

The low level trap 8 comprises a tubular portion 34 whose end is closed by a circular plate 36, on whose outer periphery there is a concentric circular flange 38 integral with it. The tube 34 and flange 38 define between them an annular trough 40. The tube 34 is provided with four longitudinally extending openings 42.

The tubes 32 and 34 are each provided with an external shoulder and are connected by the connecting tube 10 which abuts the shoulders and is secured to the tubes, as by glueing. The connecting tube 10 covers the openings 42 to a level below the upper edge of the flange 38. When the filling plug is in position on an electric cell, the low level trap is below the electrolyte level which comes approximately half way up the connecting tube 10. When the cell is being charged and begins to gas, the gas will pass up into the space between the tubes 30 and 32. Droplets of electrolyte entrained in the gas will impinge upon the tube 30 and drip down into the trough 31. When the trough 31 is full excess electrolyte will drip back into the cell. The generated gas can only escape by passing beneath the lower edge of the tube 30 and bubbling through the trough 31. The gas then passes through the ceramic partition 33 to the atmosphere.

Figure 2:
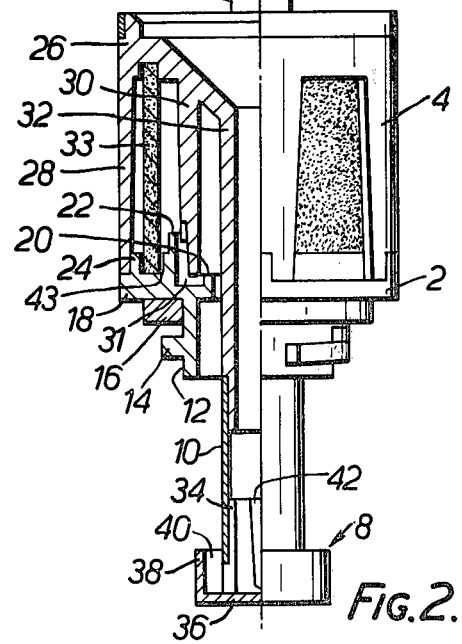
FIG. 2 is an elevation, partly in section, along the line A—A in FIG. 1.

As may be seen in FIG. 2, the lower edge of tube 30 extends downwards to a level only slightly below that of rib 20 so that only a very low over-pressure is developed in the cell before the gas will bubble through trough 31.

If the cell is not maintained for some time, the electrolyte level may drop below the low level trap.

However, the trough 40 will be left filled with electrolyte, so that the unobscured portions of the openings 42 are below the level of electrolyte in the trough. Any gas which escapes through the filling tube will therefore be obliged to bubble through the electrolyte in the trough 40.

Thus, regardless of the height of the electrolyte level, there is no path from the atmosphere to the interior of the cell that is not interrupted by a liquid trap even when the lid 6 is open. Thus, if during gassing, the gases are ignited externally of the cell the chances that the flame will pass inside the cell, thus possibly causing it to explode, are very small since the flame will have to traverse a liquid trap regardless of which path it takes.

What I claim is my invention and desire to secure by Letters Patent is:

1. A vented filling plug for an electric storage cell intended to be filled to a normal working level with liquid electrolyte, said plug comprising:
    means defining a vent path through which gas may enter or leave the cell, said vent path including a flame trap and arranged so as, in use, to communicate with the interior of said cell at a point above normal electrolyte level;
    means defining a filling path through which electrolyte may be poured into said cell, said filling path being arranged so as, in use, to communicate with the interior of said cell at a point below said normal electrolyte level; and means defining a liquid trap in said filling path, said liquid trap being positioned so as, in use, to be below said normal electrolyte level, and being so constructed and arranged that if said electrolyte is allowed to fall below the level at which said filling path communicates with the interior of said cell, said liquid trap is left at least partially filled with said electrolyte.

2. A plug as claimed in claim 1 wherein said flame trap in said vent path includes a liquid trap.

3. A plug as claimed in claim 1 wherein said flame trap in said vent path further includes a foraminous partition.

4. A plug as claimed in claim 3 wherein said foraminous partition comprises ceramic material.